Sept. 30, 1969 P. G. LUCAS ET AL 3,470,487

VARIABLE GAIN AMPLIFYING APPARATUS FOR HYBRID COMPUTER

Filed Oct. 23, 1965 3 Sheets-Sheet 1

PAUL G. LUCAS
ROBERT P. TALAMBIRAS
INVENTORS.

BY
Kenway, Jenney & Hildreth

VARIABLE GAIN AMPLIFYING APPARATUS FOR HYBRID COMPUTER

Filed Oct. 23, 1965 3 Sheets-Sheet 2

PAUL G. LUCAS
ROBERT P. TALAMBIRAS
INVENTORS.

BY
Kenway, Jenney & Hildreth

VARIABLE GAIN AMPLIFYING APPARATUS FOR HYBRID COMPUTER

Filed Oct. 23, 1965 3 Sheets-Sheet 3

PAUL G. LUCAS
ROBERT P. TALAMBIRAS
INVENTORS.

BY
Kenway, Jenney & Hildreth

United States Patent Office 3,470,487

Patented Sept. 30, 1969

3,470,487

VARIABLE GAIN AMPLIFYING APPARATUS FOR HYBRID COMPUTER

Paul G. Lucas, Sudbury, and Robert P. Talambiras, Brookline, Mass., assignors to Adage, Inc., Boston, Mass., a corporation of Massachusetts Filed Oct. 23, 1965, Ser. No. 503,291

Int. Cl. H03f 1/36

U.S. Cl. 330—86 5 Claims

ABSTRACT OF THE DISCLOSURE

The gain of the amplifying apparatus disclosed herein can be varied by means of digital signals which control feedback and attenuator resistances. Provision is made for holding the settling time of the amplifying apparatus constant in spite of changes in the resistances.

Our invention relates to computers, and particularly to a novel hybrid computer for the high speed multiplication or division of an analog signal by a number represented by a digital signal.

A demand has developed for computers capable of rapidly performing computing and processing operations on signals representing information in both analog and digital forms. In response to this demand, various combinations of analog and digital computers have been proposed. A hybrid computer particularly adapted to data processing problems of this kind is shown and described in U.S. application Ser. No. 500,740 for Hybrid Computer, filed on the same day as the present application by Joseph P. Grandine II, and assigned to the assignee of our application. In the computer there disclosed, a characteristic feature is a hybrid array of digitally controllable analog computing elements to which both analog and digital signals may be applied and which is capable of transforming the inputs into an output signal of analog or digital form in accordance with a transfer function dictated by applied digital control signals.

A hybrid array for use in a hybrid computer of the type disclosed in the above-cited application should be capable of dealing with a large class of problems, so that the effort required to install it to perform in a particular environment will be minimized. At the same time, complexity must be kept within bounds dictated by considerations of cost, reliability and speed. It is clearly possible to produce a digitally controllable analog array of any desired degree of flexibility by interconnecting such analog computing components as resistors, capacitors and amplifiers with a large enough number of switches. However, such a straightforward approach would inevitably result in an array so complex that it would not only be more costly, but inherently slower and less reliable than would otherwise be desired. It is a primary object of our invention to facilitate the construction of hybrid computers with maximum speed and flexibility, and yet having minimum cost and complexity.

We have discovered that the primary object of our invention may be realized by the use, as a component of a hybrid array of the type disclosed in the above-cited application Ser. No. 500,740, of a novel hybrid computer capable of performing the functions of algebraic summing, multiplication and division as selected by an applied digital control signal. Briefly, the hybrid computer of our invention comprises a control register for storing a digital control expression determining the transfer function of the computer, and a value register for storing a digital value signal representing a digital number to be operated on in accordance with the selected transfer function. There are also provided a set of input terminals, to which a desired number of analog signals may be applied, an output terminal for producing an analog output signal, and a network including analog computing components and switches interconnecting the input terminals to the output terminals in an array determined by the control expression. By this arrangement, an output signal is produced that represents the algebric sum of a selected set of the analog input signals multiplied or divided by the digital value stored in the value register. As will appear, the apparatus is capable of four-quadrant summation, multiplication and division.

In the computer of our invention, the analog input terminals are each connected in series with a summing resistor and a digitally controllable switch to a summing junction, such that the algebraic sum of the set of the analog input signals selected by the switches appears at the summing junction. The summing junction is connected through a digitally controllable attenuator to the input terminal of an amplifier having a second digitally controllable attenuator connected as a degenerative feedback network. The digital value stored in the value register is applied to either the input attenuator or the feedback attenuator for the amplifier, as determined by the control expression stored in the control register. For multiplication, the contents of the value register are used to select the conductance of the input attenuator. For division, the contents of the value register select the conductance of the feedback attenuator for the amplifier. One bit in the value register is preferably provided to represent the sign of the digital value, and switching means under the control of this bit are provided to invert the polarity of the output signal when the stored digital value is negative.

It will be apparent that the speed at which the digitally controlled attenuators employed in the computer of our invention can be switched from one conductance state to another is an important factor in determining the performance capabilities of the computer. Switching speed is limited, not by the rate at which the state of the switch can be changed, but by the time required for the amplifier output to settle to a repeatable value after a set of input signals have been applied. Prior to our invention, the minimum settling time attainable in a variable gain network such as that used in the computer of our invention was greatly constrained by conflicting design requirements. First, for a given amplifier configuration, the settling time is longer for small feedback conductance than for large feedback. It would, therefore, be desirable to design the amplifier to have as large a bandwidth as possible so that the settling time in the minimum feedback state would be short as possible. For fixed feedback, it is within the state of the art to design stable amplifiers having very high bandwidth. However, the maximum bandwidth for which a variable feedback network of a given configuration can be designed is determined by the maximum feedback to be provided, because the loop gain of the amplifier is highest in the maximum feedback state and the loop gain-bandwidth product of an amplifier has a maximum value that cannot be exceeded without producing instability. Thus, when designed to be stable for maximum feedback, a variable gain network of conventional design has a settling time in the minimum feedback state that is undesirably long for high speed computing purposes. Accordingly, it is a second object of our invention to reduce the settling time of variable gain networks, and to produce a digitally controllable variable gain network which has a minimum settling time.

We have discovered that the second object of our invention may be attained by so constructing the variable gain network employed in the computer of our invention that the bandwidth of the network can be varied in dependence on the amount of feedback. For this purpose, we provide, as the computing amplifier in the array, a two-stage amplifier. The first stage is an inverting amplifier having high gain, and the second stage is a non-inverting amplifier. The gain of the second stage is not critical, and in practice may be relatively low. The second digitally controllable attenuator discussed above comprises a weighted set of resistors connected across both stages through electronic switches to provide a degree of feedback dependent on the digital signals supplied to the attenuator. Associated with each of the smaller resistors is a capacitor arranged to be connected across the first stage of the amplifier when the associated resistor is connected across both stages. Each capacitor $i$ has a capacitance $Ci$ so chosen with respect to the resistance $Ri$ of the associated resistor that $RiCi=K$, where K is a constant for the network. The introduction of capacitive feedback around the first stage with the smaller feedback resistors around both stages reduces the loop bandwidth of the network, and thus makes it stable when the amplifiers are designed for high bandwidth with the capacitors and their associated resistors disconnected. Design of the amplifiers for stability at minimum conductance feedback makes it possible to obtain a much shorter settling time with only the largest resistor in the feedback network. However, with one or more capacitors connected across the first stage, the minimum settling time of the network is determined by K. For some purposes, it is desirable to limit the value of K to keep the minimum settling time small. The value of K necessary for stability is determined by the design and construction of the amplifiers, so that in general there are practical limits on the values of K that can be chosen. For these reasons, for use in a preferred embodiment of the hybrid computer of our invention, the amplifiers are designed for a bandwidth at which they are stable with an intermediate degree of resistive feedback, and capacitors are associated only with the smaller resistors in the feedback attenuator. However, it will be apparent that this feature of our invention is of wider application, and may be used to advantage for any purpose requiring a high speed variable gain network. In the broader aspects of our invention, it is contemplated that such purposes might require capacitors for each feedback state except the minimum feedback state, and that the values of capacitance and resistance might be either digitally controlled or continuously varied.

The manner in which the computer of our invention is best constructed, and its mode of operation, will best be understood from the following detailed description, together with the accompanying drawings, of a preferred embodiment thereof.

Figure 1:
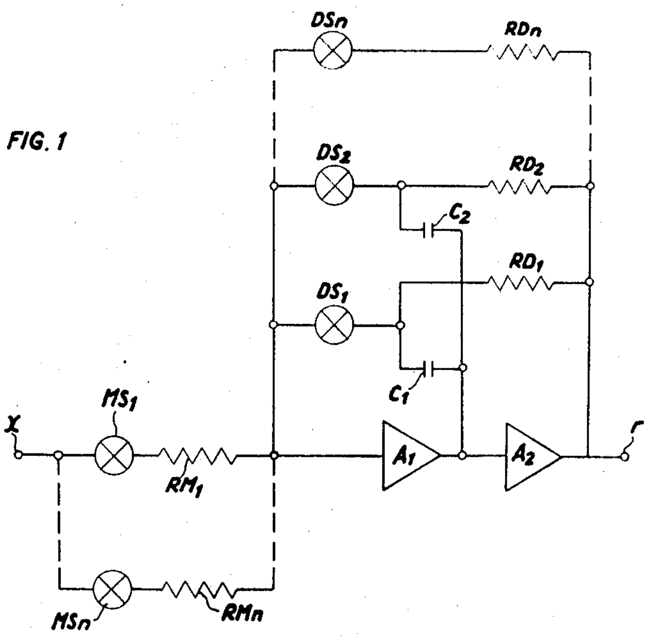
FIG. 1 is a schematic wiring diagram of a digitally controlled variable gain network suitable for use in the hybrid computer of our invention.

In the drawings, certain conventions have been adopted for simplicity of illustration and description. In particular, circuits have been shown in general as single terminal circuits, it being understood that returns to a suitable ground potential are implied. Circuits which are repeated are shown only once in detail, and are otherwise shown in block form. Digital pulses and analog signals are indicated in the drawings by identifying small letters followed where needed by identifying suffixes, and digital levels are similarly represented by capital letters and suffixes. The logical symbols are those conventionally employed; these include the dot for logical AND, + for logical OR, and a bar for inversion. Purely for expository convenience, it will be assumed that a logical 1 is represented in the system by a positive voltage, and a logical 0 by a negative voltage, with respect to ground. Analog signals will be assumed to vary between a positive value and a negative value, whereby both positive and negative numbers can be represented. As will become apparent to those skilled in the art, these conventions and restrictions are not essential to the practice of the invention.

Digital numbers are represented by a binary fraction between 0 and 1 for positive numbers, and by 1 plus the logical inverse of the corresponding positive value for negative numbers. Thus, if a positive number is represented in digital form by $m$ bits as $$\sum_{i=1}^{m} Ai2^{-i}$$

where the A's may be 0 or 1, the corresponding negative number would be represented as $$1+\sum_{i=1}^{m}(1-Ai)2^{-i}$$

This manner of representing digital numbers is chosen for convenience in the use of the apparatus with a digital computer designed for use with numbers so represented, and is not essential to the practice of our invention in its broader aspects.

Referring now to FIG. 1, we have shown a variable gain network comprising two conventional amplifier stages A1 and A2 connected in series. The amplifier A1 may be an inverting amplifier of any conventional design chosen to have high gain. For example, on one embodiment of our invention the gain was $10^5$.

The amplifier A2 may also be of conventional design, but designed to be non-inverting and to have a relatively lower gain. In the practical embodiment just referred to, the gain was about 10.

An input terminal $x$ is connected to the input terminal of the amplifier A1 through a digitally controllable attenuator comprising a set of $n$ resistors RM1 through RM$n$, connected between the input terminal $x$ and the input terminal of the amplifier A1 through electronic switches MS1 through MS$n$ of any conventional construction. The successive resistors in the network from RM1 through RM$n$ are selected to have resistances weighted in accordance with a desired number system; for example, and preferably, they are weighted in the binary order 1, 2, 4, etc. The corresponding conductances are accordingly weighted in the order ½, ¼, etc. It will be apparent that if a binary signal is employed to control the switches MS1 through MS$n$, with the highest ordered bit of the signal controlling the switch MS1 and the lowest ordered bit controlling the switch MS$n$, the attenuator may be set to have a conductance that is proportional to the binary number represented by the signal.

A second digitally controllable attenuator is connected across the amplifiers A1 and A2 to form a feedback network. In this network, a resistive feedback path of digitally controllable conductance extends between the output terminal $r$ of the amplifier A2 and the input terminal 5 of the amplifier A1. A bandwidth control feedback path having a digitally controllable capacitance is connected between the output terminal of the amplifier A1 and its input terminal.

The resistive feedback path comprises a series of binary weighted resistors RD1 through RD$n$, connected between the output terminal $r$ of the amplifier A2 and the input terminal of the amplifier A1 through a corresponding set of switches DS1 through DS$n$, which may be conventional electronic switches of any suitable design. The resistances RD1 through RD$n$ are selected in the same manner as the resistors in the input attenuator, to be weighted in accordance with a selected number system, as in the order 1, 2, 4, etc. for the resistors RD1, RD2, etc. By this arrangement, a digital signal applied to the switches DS1 through $DSn$ with the highest ordered bit applied to the switch DS1 and the lowest ordered bit applied to the switch $DSn$ will produce a feedback path having a conductance proportional to the number represented by the signal.

Associated with at least the smaller resistors RD is a set of capacitors C1, C2, etc. Each of the capacitors such as C1 is connected between the output terminal of the amplifier A1 and the junction of the associated switch such as DS1 and resistor such as RD1. By this arrangement, each capacitor is switched into a feedback path around the amplifier A1 when its associated resistor is switched into a feedback path around both amplifiers.

Each capacitor such as C1 has a capacitance C selected so that $RC=K$, where R is the resistance of the associated resistor such as RD1 and K is a constant for the network. From elementary principles, it can be shown that $ReCe$ is also equal to K, where $Re$ is the equivalent resistance of any set of resistors such as RD1 connected in parallel and $Ce$ is the equivalent capacitance of any set of corresponding capacitors such as C1 connected in parallel. It can also be shown that if the gain of the first amplifier A1 is high, and any set of the resistors such as RD1 and RD2 are connected across both stages A1 and A2 of the amplifier with their corresponding capacitors connected across the first stage, the time constant of the amplifier will be given by $K/A2$. This time constant is independent of the impedance of the input attenuator comprising the resistors RM1 through $RMn$.

Since the time constant of the network with any of the capacitors connected across the amplifier A1 is the same, the bandwidth of the network is also a constant. The constant K should be chosen such that the loop bandwidth under these conditions is smaller than the amount desired at minimum conductance feedback by an amount sufficient to make the network stable at maximum conductance feedback. Since the introduction of a capacitance feedback path around the amplifier A1 increases the settling time of the network, the minimum settling time will be increased. As K is increased, at some value the increasing minimum settling time will equal the settling time at minimum feedback. That value of K should not be exceeded, because a larger value would make the maximum feedback conductance state the speed-limiting factor. Of course, the maximum bandwidth attainable, or cost considerations, may make it necessary to choose a lower bandwidth than would correspond to that value of K in a particular case. K may also be chosen for a lower minimum settling time which is constant only over part of the feedback conductance range.

From elementary considerations, it can be shown that the voltage $Er$ at the output terminal of the network of FIG. 1 is related to the voltage $Ex$ at the input by the equation $$Er=\frac{GM}{GD}Ex$$

where GM is the equivalent conductance of the input attenuator comprising the resistors RM1 through $RMn$ and GD is the conductance of the feedback attenuator comprising the resistors RD1 through $RDn$. It will thus be apparent that the network may be made to function as either a multiplier or a divider by supplying a digital input signal to the switches MS1 through $MSn$ or DS1 through $DSn$, respectively, to set the selected attenuator to a conductance value proportional to the number represented by the digital signal. When either attenuator is selected, the other is set to a unity value of conductance, or, if desired, set to 0 and replaced by a conductance of unity value, in a manner to be described.

Figure 2:
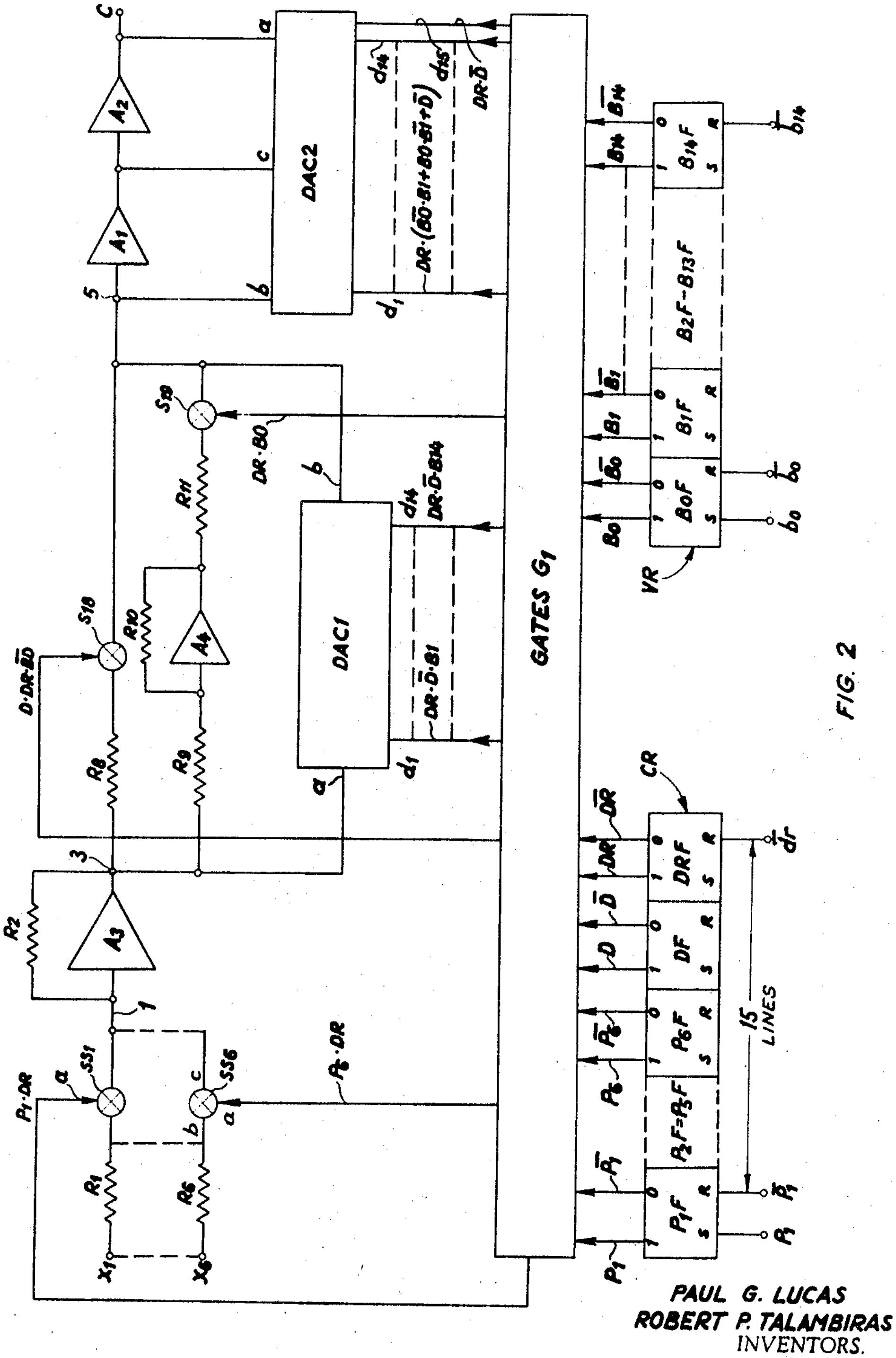
FIG. 2 is a schematic wiring diagram of a hybrid computer in accordance with our invention.

Referring now to FIG. 2, we have shown the details of a practical embodiment of our invention adapted to multiply or divided an analog input signal by a digital signal expressed by a sign bit plus 14 bits specifying the value of the signal. As discussed above, positive numbers are represented as a binary fraction between 0 and 1, and negative numbers are represented by the inverse of the corresponding binary fraction plus a sign bit that is logic 1 when the number is negative.

A control register CR is provided for storing the bits of an 8 bit control expression. This register may be of any conventional construction, but as suggested in FIG. 2 preferably comprises a set of conventional flip-flops P1F through P6F, DF and DRF. Each flip-flop such as P1F is arranged to be set to its logic 1 state to produce a positive potential at its output terminal 1 and a negative potential at its output terminal 0 when a positive potential is applied to its input set terminal S, and to be reset to the logic 0 state in which the output terminal 0 is at a positive potential and the 1 output terminal is at a negative potential when a positive potential is applied to its reset terminal R.

The bits P1 through P6 stored in the flip-flops P1F through P6F are employed to select any desired set of six analog input potentials applied to six analog input terminals $x1$ though $x6$. The flip-flop DF is set to its logic 1 state when it is desired to operate the computer as a divider, and is set to its logic 0 state when it is desired to operate the unit as a multiplier. The flip-flop DRF is employed to turn the computer on and off; when in its logic 1 state the computer is operative. Pulses such as $p1$ and $\overline{p1}$ are applied to the flip-flops such as P1F to set the flip-flops to states selected in dependence on the desired function of the computer. Such pulses may be supplied by any suitably programmed digital computer, as described for example in the above-cited application of Joseph D. Grandine, II.

A value register VR is provided for storing the 15 bit value signal to be used as either the multiplier or divisor for the analog input signal. This value register may be of the same construction as the control register, and comprises a flip-flop B0F for storing the sign bit and 14 flip-flops B1F through B14F for storing the 14 bit value signal. The highest-ordered bit of the value signal is stored in the flip-flop B1F.

The analog input signals applied to terminals $x1$ through $x6$ are supplied through summing resistors R1 through R6 and conventional electronic switches SS1 through SS6 to a summing junction 1. Each of the analog input terminals is connected to the summing junction 1 when its associated switch such as SS1 is closed. The switches such as SS1 may be of any conventional design, arranged to be closed when a positive input signal is supplied to a terminal such as the terminal $a$ of the switch SS6 to close the path between the terminals $b$ and $c$ of the switch SS6, and to provide an open circuit between the points $b$ and $c$ when a negative signal is applied to the input terminal such as $a$. A two-stage electronic switch suitable for this purpose will be shown and described in connection with FIG. 3.

Each of the switches such as SS1 and SS6 receives a signal that is positive when the flip-flop DRF is set to its logic 1 state and when a corresponding selection flip-flop P1F through P6F is in its logic 1 state. Thus, the first switch SS1 receives the signal $P1\cdot DR$, and the switch SS6 receives the signal $P6\cdot DR$. These signals may be produced in a conventional manner by a set of gates G1 of conventional construction. It is not thought necessary to describe these gates in detail, since their construction will be apparent to those skilled in the art from ordinary design considerations. However, for example, the signal such as $P1\cdot DR$ could be produced by a NOR gate to which the signals $\overline{P1}$ and $\overline{DR}$ were supplied from the control register CR.

The summing terminal 1 is connected to the input terminal of a conventional amplifier A3 having a feedback resistor R7 to produce an output signal at its output terminal 3 proportional to the algebraic sum of the input signals applied to the terminals $x1$ through $x6$ selected by the closed ones of the switches SS1 through SS6.

The output terminal 3 of the amplifier A3 is connected to the input terminal 5 of a two-stage amplifier comprising amplifiers A1 and A2, constructed in the manner described in connection with FIG. 1, over a set of paths selected in dependence on the contents of the control register CR and the value register VR. A first path extending from the terminal 3 to the terminal 5 includes a summing resistor R8 and a conventional electronic switch S18. The switch S18 may be of any conventional construction, and is arranged to be closed when the flip-flops DF and DRF are in their set states and when the flip-flop B0F is in its reset state. For this purpose, the switch S18 receives a signal $D \cdot DR \cdot \overline{B0}$, formed by conventional gates G1 in response to appropriate conditions on the control and value register output terminals in a manner obvious to those skilled in the art. The resistance of the resistor R8 is selected to multiply the input signal by 1 when the unit is functioning as a divider and the applied digital value signal is positive.

A second path between the terminals 3 and 5 includes a resistor R9, a conventional inverting amplifier A4 having a feedback resistor R10, a summing resistor R11 and a conventional electronic switch S19. The switch S19 may be of any conventional construction, and is designed to be closed when the flip-flop DRF is set and the flip-flop B0 is set by a suitable gate in the gates G1 producing an output signal $DR \cdot B0$. This path is closed by closing of the switch S19 when a negative number is stored in the value register VR. The resistors R9 and R10 are selected to provide unity gain between the terminal 3 and the output terminal of the amplifier A4, and the resistor R11 is made equal to the resistor R8. By this arrangement, when the switch S19 is closed, a negative signal equal to −1 times the analog input signal is produced at the terminal 5. When the unit functions as a divider, and negative numbers are placed in the value register, this signal is the sole signal supplied to the amplifier A1, and serves to multiply the analog input signal by −1 to provide the appropriate sign for the quotient. When the unit is functioning as a multiplier, the path controlled by the switch S19 performs a similar function and also performs the function of correcting for the representation of the negative number by its inverse. That function will be described in more detail below.

A third path between the terminals 3 and 5 comprises a digitally controllable attenuator here shown as a digital-to-analog converter DAC1 having an analog input terminal *a* and an analog output terminal *b* and provided with 14 digital input terminals *d*1 through *d*14 to which a digital value signal is supplied to select the conductance of a path between the input terminal *a* and the output terminal *b* in a manner that will be described below. Each of the digital control terminals *d*1 through *d*14 receives a logic 1 signal when the corresponding flip-flop B1F through B14F is set, the flip-flop DF is reset, and the flip-flop DRF is set. This signal is formed by the gates G1, and may for example be formed for each of the terminals such as D1 by a three-terminal NOR gate receiving signals such as $\overline{D}$, $\overline{DR}$, and $\overline{B1}$.

As described in connection with FIG. 1, the amplifier A1 in FIG. 2 is an inverting amplifier selected to have relatively high gain, and the amplifier A2 is a non-inverting amplifier which may have relatively low gain. Digitally controllable feedback around both stages of the amplifiers is provided by a digitally controllable feedback attenuator here shown as a digital-to-analog converter DAC2. The attenuator DAC2 may be the same as the attenuator DAC1, in that it has an analog input terminal *a* connected to the output terminal *e* of the amplifier A2 and an input terminal *b* connected to the input terminal 5 of the amplifier A1. It is arranged with 15 digital input terminals *d*1 through *d*15, to set the value of conductance between the terminals *a* and *b* in response to an applied digital control signal. It is additionally provided with an output terminal *c*, connected to the output termianl of the amplifier A1. As will be described, a digital control signal applied to the terminals *d*1 through *d*15 may also select a capacitance for connection between the terminals *b* and *c* to provide a capacitive feedback around the amplifier A1 under conditions requiring lower bandwidth for stability.

The input terminals *d*1 through *d*14 of the digital-to-analog converter DAC2 are supplied from the value register VR and the control register CR by means of gates G1. The gates G1 supply the value stored in the value register to the attenuator DAC2 when the number stored is positive, and supply the inverse of the signal stored in the value register when the number is negative. These gates will be described in more detail below in connection with FIG. 4.

Figure 3:
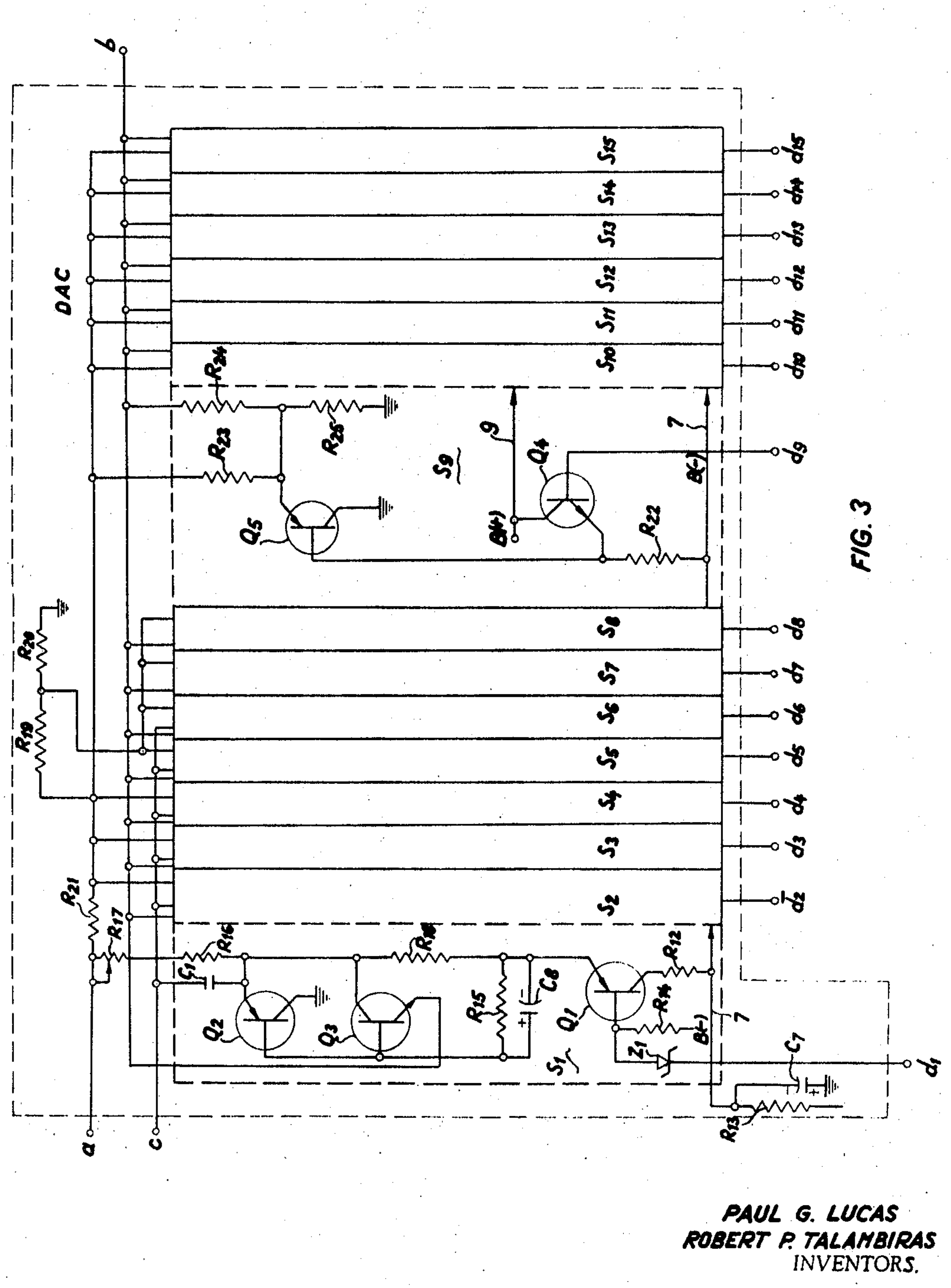
FIG. 3 is a schematic wiring diagram of a digitally controlled attenuator forming part of the apparatus of FIG. 2.

Referring now to FIG. 3, a digital-to-analog converter DAC is shown which is suitable for use as the attenuator DAC2 in FIG. 2, and, with or without modification, for use as the digital analog converter DAC1 in FIG. 1. The unit DAC includes certain components which are not necessary for use as the attenuator DAC1, but these components may be either omitted or simply not used, as dictated by considerations of manufacturing convenience and cost.

The attenuator DAC includes 15 electronic switches S1 through S15, for selecting the conductance between the input terminal *a* and the output terminal *b* and the capacitance between the input terminal *c* and the output terminal *b*, in dependence on the digital signal supplied to the input terminals *d*1 through *d*15.

Each of the switches to be described may be of any conventional construction, within the broader aspects of our invention, but as here shown we preferably make the switches S1 through S8 of the same construction shown for the typical switch S1, and the switches S9 through S15 of the same construction shown for the typical switch S9.

The switch S1 comprises two pnp transistors Q1 and Q2 and an npn transistor Q3. The transistor Q1 has a collector connected to a suitable source of negative potential on a bus 7 through a resistor R12. The bus 7 is supplied, through a resistor R13 shunted by a filter capacitor C7, from a suitable source of negative potential B(−). The base of the transistor Q1 is returned to the same potential B(−) through a resistor R14. The base is also connected to the input terminal *d*1 of the unit DAC through a Zener diode Z1. The transistor Q1 is normally conducting, but is arranged to be turned off to produce very high impedance between its collector and emitter by a positive potential such as +2.5 volts applied to the input terminal *d*1.

The transistor Q2 has its collector connected to ground, and its base connected to the emitter of the transistor Q1 through a resistor R15 shunted by a capacitor C8. The emitter of the transistor Q2 is connected to the output terminal *c* through a first bandwidth control capacitor C1. The emitter of the transistor Q2 is also connected to the input terminal *a* through a resistor R16 in series with a small trimming resistor R17. The resistors R16 and R17 correspond to either the resistor RD1 or the resistor RM1 in FIG. 1. The emitter of the transistor Q2 is also connected to the emitter of the transistor Q1 through a resistor R18.

The transistor Q3 has its collector connected to the junction of the resistors R16 and R18. The emitter of the transistor Q3 is connected to the output terminal *b* of the unit DAC. The base of the transistor Q3 is connected to the base of the transistor Q2.

In the operation of the switches such as S1, with the logic 0 signal of −2.5 volts, or no input signal, supplied to the input terminal *d*1, the transistor Q1 will be conducting to supply a negative biasing potential to the bases of the transistors Q2 and Q3 through the resistor R15. A negative biasing potential will also be supplied to the emitter of the transistor Q2 and the collector of the transistor Q3 through the resistor R18. Under these conditions, the transistor Q2 will be forward-biased to conduct saturation current to ground, essentially grounding the resistor R16 with respect to the input terminal *a*. The transistor Q3 will be cut off, disconnecting the output terminal *b*. When a logic 1 signal of +2.5 volts is applied to the input terminal D1, the transistor Q1 will be cut off. Under these conditions, with the emitter of the transistor Q1 effectively open, the transistor Q2 will be cut off and the transistor Q3 will present an effective short circuit between its collector and emitter, being biased to saturation at this time by the charge stored in the capacitor 68. A resistive path will then extend from the input terminal *a* of the unit DAC through the resistors R16 and R17 in series, to the output terminal *b*. A capacitive path will extend from the output terminal *b* through the transistor Q3 and the capacitor C1 to the output terminal *c*. In one practical embodiment of our invention, with the illustrative values of voltages given above and a voltage B(−) of −10 volts, the resistor R13 was 150 ohms, and the capacitor C7 was 250 microfarads rated at 10 volts. In each of the switches S1 through S8, the resistors such as R12 were 47 ohms, the resistors such as R14 were 4.7K ohms, the resistors such as R15 were 4.7K ohms, the capacitors such as C8 were 68 microfarads, 6 volts, and the resistors such as R18 were 1.8K ohms. The resistors such as R16 were 40K ohms for switches S1 and S5, 80K ohms for the switches S2 and S6, 160K ohms for the switches S3 and S7, and 320K ohms for the switches S4 and S8. The switches S5 through S8 employ the same internal resistors as the higher ordered switches S1 through S4. This is made possible by the use of a potential divider preceding the switches S5, S6, S7 and S8 and comprising a resistor R19 and a resistor R20 connected in series between the input terminal *a* and ground.

In a practical embodiment of our invention, the resistor R19 had a value of 20K ohms and the resistor R20 had the value 1.4222K ohms. By this arrangement, a very wide range of conductance values can be provided in the computer without the use of a correspondingly wide range of resistance values. In the embodiment of the invention described, a second trimming resistor R21 was provided of 4.7 ohms. The resistors such as R16 and the resistors R19 and R20 had a tolerance of .01 percent precision.

The bandwidth control capacitors, such as C1 for the switch S1, and the corresponding capacitors used for the switches S2, S3, S4, S5 and S6, were 100 picofarads for the switch S1, 47 picofarads for the switch S2, 22 picofarads for the switch S3, 10 picofarads for the switch S4, 5 picofarads for the switch S5, and 3 picofarads for the switch S6. The capacitors for the switches S3 and S4 had a 5 percent tolerance, whereas the other capacitors had 10 percent tolerance. These capacitors do not require the precision of the resistors such as R16, as they are not used for computing, but merely to ensure the stability of the amplifiers. Capacitors were not used beyond the switch S4, because the values would be negligible in effect compared to other capacitances inherent in the network.

The switches S9 through S15 may be of simpler construction than the switches S1 through S8, because they are required to switch smaller currents. As shown for the typical switch S9, these switches comprise a first npn transistor Q4 and a pnp transistor Q5. The base of each transistor such as Q4 is directly connected to the input terminal such as *d*9 on which the corresponding digital value signal is produced. The collector of the transistor Q4 is connected directly to a bus 9 and thence to a terminal B(+) of a suitable positive voltage supply. The emitter of the transistor Q4 is returned to the negative supply bus 7 through a resistor R22.

The collector of the transistor Q5 is grounded, and its base is connected to the emitter of the transistor Q4. The emitter of the transistor Q5 is connected to the input terminal *a* of the attenuator DAC through the trimming resistor R21 previously described and a resistor R23. The emitter of the transistor Q5 is connected to ground through a resistor R25, and to the output terminal *b* of the attenuator DAC through a resistor R24.

In the operation of the switches such as S9, the transistor Q4 is normally cut off with a negative logic 0 potential of −2.5 volts applied to its input terminal *d*9. The transistor Q5 is accordingly forward-biased through the resistor R22, and it conducts saturation current to ground, grounding the junction of the resistors R23 and R24. When a positive potential is applied to the input terminals such as *d*9, the corresponding transistor Q4 conducts, and the base of the transistor Q5 goes positive, cutting the transistor Q5 off. The conductance of the path between the input terminal *a* and the output terminal *b* is thereby increased, with the resistors R23 and R24 now being effectively in series with the resistor R21 in a path between the terminals *a* and *b*. In a manner similar to that described in connection with the switches S1 through S8, the potential dividers comprising the resistors such as R24 and R25 are employed to make it possible to switch smaller values of conductance without requiring correspondingly large resistors of great precision.

In a particular embodiment of our invention in which the values described above were employed, in the switches such as S9 the resistors such as R22 were 10K ohms, and the resistors such as R25 were all 1 megohm, 1 percent, ¼ watt resistors. All of the resistors such as R23, R24 and R25 were 1 percent, ¼ watt resistors. The resistors such as R23 were all 100K ohms. The resistor R24 for the switch S9 was 11K ohms. For the switch S10 the corresponding resistor such as R24 was 5.11K ohms. The resistors such as R24 for the other switches were 2.55 ohms for S11, 1.21K ohms for S12, 604 ohms for S13 and 301 ohms each for S14 and S15. The extra switch S15 is provided for use in the feedback attenuator to make the divisor exactly 1.0 when the unit is used as a multiplier. Since digital numbers are represented as binary fractions in this embodiment of our invention, supplying logic 1's only to the 14 value input terminals would produce a division factor differing from one by a 1 bit in the least significant position.

Figure 4:
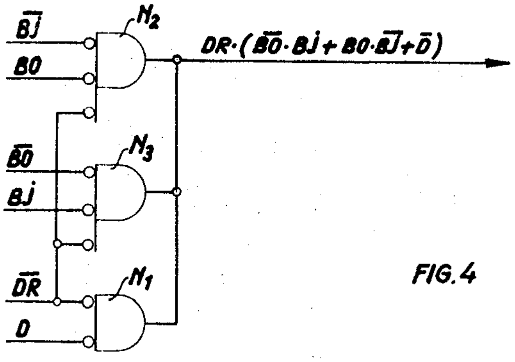
FIG. 4 is a schematic wiring diagram of typical gating circuits employed in the apparatus of FIG. 2.

FIG. 4 shows typical gate circuits for a value input signal B*j*, corresponding to any of the value input signals B1 through B14 in FIG. 2. These gates may each comprise three conventional NOR gates N1, N2 and N3. The gates may be of any conventional construction, suitable for producing a positive output signal when negative input signals are applied to all input terminals, and producing a negative output signal when a positive signal is applied to any input terminal. The gates are preferably of the type that, when connected with the output terminals in common as shown in FIG. 4, a positive input signal applied to any of the gates will cause the common output terminal to be positive. As shown, the first gate N1 receives the signals D and $\overline{DR}$, and accordingly produces an output signal each time the apparatus is set to operate by the setting of the flip-flop DRF in FIG. 2 and the apparatus is in the multiply state as directed by the flip-flop DF in its reset state. 1's will accordingly be supplied to the input terminals D1 through D14 of the digitally controlled attenuator DAC2 in FIG. 2 under those conditions. An additional gate, not shown but which may be of the same type, is provided to produce the signal $DR \cdot \overline{D}$, to supply a 1 bit to the input terminal *d*15 when the unit is in the multiply state.

The gates N2 and N3 are provided to produce the appropriate logic 1 signal for both positive numbers expressed as binary fractions and negative numbers expressed as inverses of the corresponding fractions. For this purpose, the gate N2 receives the signals B0 and $\overline{Bi}$, and the gate N3 receives the signals $\overline{B0}$ and B*j*. Accordingly, if the value is positive and B0 is logic 0, the gate N2 will produce an output signal if the corresponding bit is logic 1. The gate N3 will produce an output signal if the input value is negative and the value of the corresponding bit is logic 0.

The overall operation of the apparatus will now be described with reference to FIGS. 1 through 4. Referring first to FIG. 2, assume that a control expression has been loaded into the control register CR and that a value has been loaded into the value register VR. Let it further be assumed that a set of analog input signals is supplied to the terminals *x*1 through *x*6. Assuming that the flip-flop DRF is set, the unit will proceed to produce an output signal at the output terminal *e* that is proportional to the algebraic sum of the inputs *x*1 through *x*6, selected by the states of the flip-flops P1F through P6F, either multiplied or divided by the value stored in the flip-flops B1 through B14F as selected by the state of the flip-flop DF. Whether the signal at the summing junction 1 is positive or negative, it is to be multiplied by a digital value logic 1 signals are applied to the input terminals *d*1 through *d*15 of the feedback attenuator DAC2 to direct division by 1. The switch S18 will be open, and the switch S19 will be closed if the number is negative and open if it is positive. If the number to be multiplied is positive, the only available signal path from the terminal 3 to the terminal 5 is through the digital attenuator DAC1, which is set to a conductance state determined in dependence on the value stored in the value register.

If the digital number is negative, the switch S19 will be closed. To understand the operation of the apparatus in this state, it should be noted that the inverse $$\sum_{i=1}^{m}(1-Ai)2^{-i}$$

of a binary fraction $$\sum_{i=1}^{m}Ai2^{-i}$$

differs from its one's complement $$1-\sum_{i=1}^{m}Ai2^{-i}$$

only by $2^{-m}$. Since $m=14$ in the embodiment shown, negative numbers expressed as their inverses can be considered as though expressed as their 1's complements without material error. If desired, even this small error could be eliminated by using the switch S15 in the unit DAC1 to introduce an additional 1 bit in the least significant position when multiplying by a negative number so that a conductance proportional to the true complement would be produced, in a manner analogous to the correction made in the unit DAC2. By either arrangement, attenuator DAC1 will produce an output signal proportional to the 1's complement of the digital number times the analog signal at terminal 3. The amplifier A4, however, will supply a signal through the summing resistor R11 that is proportional to the negative value of the signal at the terminal 3. The resulting signal at the terminal 5 will be the same as though the negative number had been expressed as the corresponding fraction, rather than the complement, and the sign will be correct. This may readily be shown, as follows: Let a negative digital number B be represented by M bits as its one's complement $1-B$. If the analog input signal is X, the signal component at the terminal 5 supplied by the attenuator will be $X-BX$. The signal contributed by the path including the amplifier A4 will be —X, as described above, so that the resultant signal at the terminal 5 will be —BX.

If division is directed by setting the flip-flop DF, the value signals, inverted if the number is negative, will be supplied to the input terminals *d*1 through *d*14 of the feedback attenuator DAC2. No input signal will be supplied to the input terminal *d*15 of the attenuator DAC2. If the number is negative, the switch S19 will be closed to produce a signal at the input terminal 5 of the amplifier A1 equal to —1 times the signal at the terminal 3. If the number is positive, this switch will be opened and the switch S18 will be closed, to produce a signal equal to 1 times the signal at the terminal 3 at the terminal 5. The output signal at terminal *e* will accordingly be positive or negative in dependence on the signs of both the algebraic sum of the analog input signals and of the digital value.

While we have described our invention with respect to the details of a specific embodiment thereof, many changes and variations will become apparent to those skilled in the art upon reading our description, and such can obviously be made without departing from the scope of our invention.

Having thus described our invention, what we claim is:

1. A high speed variable gain network, comprising, a first high gain-inverting amplifier having an input terminal and an output terminal means including a variable attenuating resistance for applying an analog input signal to said input terminal, a second non-inverting amplifier having an output terminal and an input terminal connected to the output terminal of said first amplifier, a parallel array of resistors having resistances directly proportional to the successive integral powers of two, one terminal of each resistor being connected to the output terminal of said second amplifier, a parallel array of capacitors of capacitances inversely proportional to the successive powers of two, one for each of a plurality of said resistors having the smallest resistance, one terminal of each capacitor being connected to the output terminal of said first amplifier, a switch connected in series with each resistor and the second terminal of the associated capacitor, each such switch having control means which, when actuated, establishes a two-stage feedback path through one resistor and a single-stage feedback path through the associated capacitor, and means for selectively actuating said switches.

2. A high speed variable gain network, comprising a first high gain inverting amplifier and a second non-inverting amplifier connected in series between an input terminal and an output terminal and having an intermediate terminal, a multibranch feedback path interconnecting the input terminal with the output terminal, each branch including a switch having a first conduction terminal connected to said input terminal and a resistor having a first terminal connected to said output terminal, the second terminal of said resistor being connected to the second conduction terminal of said switch, and each of a lowest ordered set of said branches comprising a capacitor interconnecting the second conduction terminal of said switch with said intermediate terminal, whereby closure of each switch establishes a single-branch two-stage resistive feedback path and a single state capacitive feedback path, the resistances of the several branches increasing in order from a lowest ordered branch to the highest in a preassigned relation to branch number, the capacitances of the several branches of said lowest ordered set decreasing inversely from branch to branch, in accordance with said preassigned relation, and means for selectively closing said switches.

3. Apparatus as defined in claim 2 wherein the several resistors are proportioned to have resistances that increase, from branch to branch, in proportion to the successive integral powers of a common radix and wherein the several capacitors are proportioned to have capacitances that diminish, from branch to branch, in inverse proportion to the successive integral powers of said common radix.

4. Apparatus as defined in claim 3 wherein said common radix is the number two.

5. In a hybrid computer, variable gain amplifying apparatus comprising:

an inverting amplifier of relatively high gain having an input terminal and an output terminal;

means, including a variable attenuating resistance, for applying an analog input signal to the input terminal of said inverting amplifier;

a non-inverting amplifier of relatively low gain having an input terminal and an output terminal;

means connecting the input terminal of said non-inverting amplifier to the output terminal of said inverting amplifier;

means for providing a feedback path of variable capacitance around said inverting amplifier;

means for providing a feedback path of variable resistance around said inverting and non-inverting amplifiers together;

means for simultaneously adjusting said variable feedback capacitance and said variable feedback resistance in constant inverse proportions whereby the settling time of the amplifying apparatus remains constant as the gain thereof is adjusted by means of said variable attenuating resistance and said variable feedback resistance.

References Cited

UNITED STATES PATENTS

| | | | |
|---|---|---|---|
| 2,976,430 | 3/1961 | Sander. | |
| 3,153,202 | 10/1964 | Wodlam | 330—86 X |
| 3,315,223 | 4/1967 | Hibbard et al. | 340—15.5 |

ROY LAKE, Primary Examiner

JAMES B. MULLINS, Assistant Examiner

U.S. Cl. X.R.

330—100, 107